Figure 1:
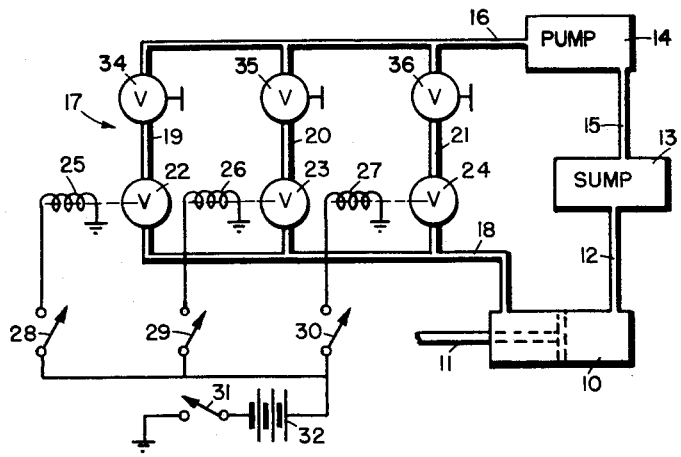

Sept. 12, 1961     J. L. BOWER     2,999,482

DIGITAL FLUID CONTROL SYSTEM

Filed April 15, 1957

INVENTOR.
JOHN L. BOWER

BY

ATTORNEY

United States Patent Office 2,999,482
Patented Sept. 12, 1961

2,999,482
DIGITAL FLUID CONTROL SYSTEM
John L. Bower, Downey, Calif., assignor to
North American Aviation, Inc.
Filed Apr. 15, 1957, Ser. No. 652,890
10 Claims. (Cl. 121—38)

This invention relates to the control of fluid motors and is particularly concerned with control of a fluid motor by a digitally coded signal.

It is often desirable to control the rate of movement of a machine tool or other fluid motor operated device in accordance with information expressed in a particular number system. For example, the feed rate of a digitally controlled milling machine might be specified in terms of a binary number of three bits or binary digits and the requirement would then be that the rate of feed be made to correspond to such number.

One way of accomplishing the generation of such a controlled speed, assuming the binary number would be presented in the form of electrical signals, would be to convert the electrical signals to a proportionate analog current and use this current to control the opening of a valve whose flow would be passed to a piston to move the load. Such an arrangement is undesirable because of the cost of suitably accurate proportional valves. Another solution might be to set up as many valves as there are different rates of movements specified by the binary number and to open each valve when its proper binary number appears. Obviously an inordinately large number of valves would be required in such an arrangement.

The present invention effects desired control of a fluid motor in response to a digitally coded signal by an arrangement which requires neither expensive proportional valves nor a great number of valves of any type but which nevertheless provides a large number of different control levels of high precision.

In accordance with the present invention a digitally coded signal is caused to provide a plurality of fluid signals individually proportional to the digits of such coded signal and means are provided for combining these fluid signals to provide an analog fluid signal indicative of the number represented by the original digitally coded signal. More specifically, a plurality of fluid flow conduits are connected in parallel between a pump and the fluid motor to be controlled. The fluid flow in each conduit is weighted in accordance with a predetermined digital code by the provision of flow restricting means such as adjustable valves or restrictive orifices in each conduit. Each conduit is further provided with a switch suitably in the form of a simple valve for selectively blocking the flow of fluid therethrough. Provision is made for the actuation of the several blocking valves individually or in any combination in accordance with an input digital signal which may conveniently be electrical in nature.

An object of this invention is to provide an improved fluid motor control system.

A further object is to control a fluid motor in accordance with a digitally coded signal.

Still another object of this invention is to effect operation of a fluid motor at a speed proportional to a requirement specified in terms of a predetermined number system.

Another object of this invention is to achieve multi-level precision control of a fluid motor by the use of a small number of simple and inexpensive valves.

A further object is to effect digital to analog conversion of a signal by fluid means.

Another object is to provide apparatus for effecting hydraulic summation of digital signals.

Figure 2:
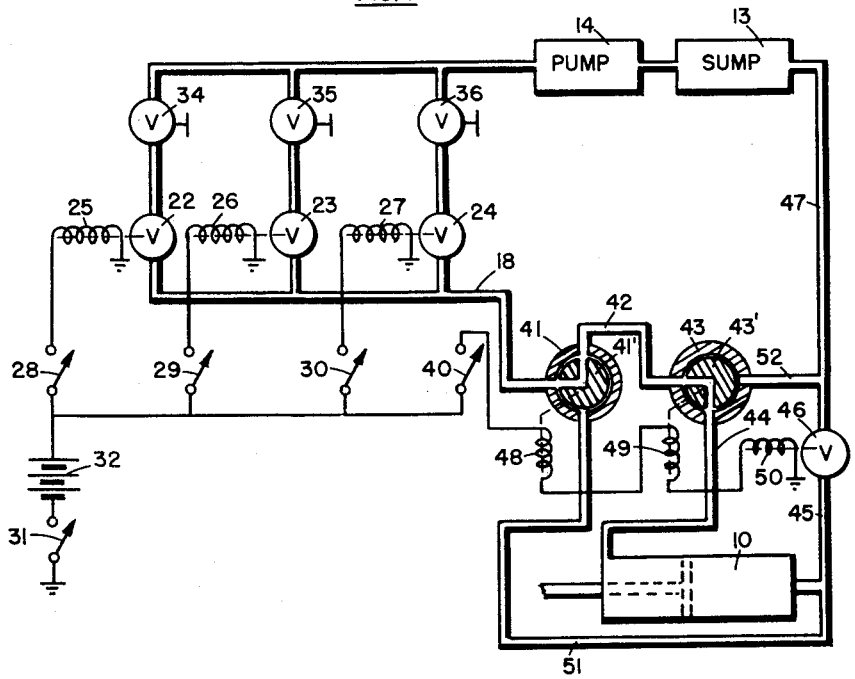

These and other objects of this invention will become apparent from the following description taken in connection with the accompanying drawings, in which FIG. 1 illustrates a control system utilizing the principles of this invention, and FIG. 2 illustrates the adaptation of the system of FIG. 1 for bidirectional drive.

Referring now to FIG. 1, an hydraulic motor 10 shown as comprising a fluid filled cylinder and piston is adapted to have the piston shaft 11 thereof suitably coupled to effect movement of a driven device such as, for example, the work table of a milling machine (not shown) at any one of a plurality of speeds which may be specified by a digitally coded signal. One end of the motor cylinder is fluid coupled by means of exhaust conduit 12 to a sump 13 from which a high pressure pump 14 draws fluid through conduit 15. It will be readily appreciated that with a closed loop hydraulic system super-charged by make-up supply, the sump disclosed may be eliminated. The pump 14 supplies an incompressible fluid such as oil at a constant high pressure through conduit 16, connected to the discharge thereof, to a digital to analog fluid conversion network 17 having an output conduit 18 connected to supply fluid under pressure to the cylinder of motor 10. The digital to analog conversion network 17 comprises a group of conduits 19, 20 and 21 which are coupled in parallel between conduits 16 and 18 to provide a plurality of separate and distinct fluid flow paths therebetween. The number of such conduits 19 through 21 is determined in accordance with the number of orders of the digital control signal which specifies the required motor speed. Thus, the three conduits illustrated are utilized in conjunction with a command signal which is to be specified by not more than three digits. Each conduit has a valve 22, 23, 24 therein, each adapted to be actuated by energization of the respective solenoid coils 25, 26, and 27. The valves may be of any suitable type of two-position valves which, for example, will completely block the flow of fluid in the associated conduit when its associated solenoid is de-energized and will open the conduit to fluid flow upon energization of the solenoid. The several solenoid operated valves may be opened or closed individually or in any combination by actuation of a corresponding one or group of the command devices 28, 29 and 30 respectively. Most conveniently these command devices may simply comprise two-position electrical switches each of which when closed causes an electrical current to be conducted through main switch 31 (when closed), a source of electrical energy such as battery 32, and that one of solenoid coils 25, 26, and 27 which is connected to the particular one of switches 28, 29 and 30 which is closed. When this switch is open, of course, the associated solenoid is de-energized and the valve 22, 23 or 24 is closed. Thus, by selective actuation of any one of the command devices 28, 29, 30 fluid may be caused to flow through common output conduit 18 from any one or any combination of conduits 19, 20, and 21.

By assigning different weights or values to the fluid flow rates in the respective ones of conduits 19, 20 or 21 there are obtained a plurality of hydraulic signals each distinct from the others by reason of its particular rate of flow. The rate of flow of fluid in common output conduit 18 is the sum of the flow rates of the conduits 19, 20 and 21 whereby it will be seen that with different flow rates in the respective conduits a total of eight different flow rates (including zero flow) may be obtained by selective operation of the valves 22, 23 and 24. The speed of the piston shaft 11 is directly related to the flow rate of fluid in conduit 18 whereby the speed of the driven element will be directly related to the sum of the fluid flows in the several parallel conduits.

In digital control systems the binary number system is most commonly used and thus each of the command devices 28, 29 and 30 may represent the two binary digits of such binary number system when open and closed respectively. Each switch is specifically associated with a value indicative of its binary order, so that, for example, when closed, switch 28 may indicate or command a unit value of flow rate, switch 29 may indicate or command two units of flow rate and switch 30 may indicate or command four units of flow rate. The switches 28, 29 and 30 may be operated manually to designate the required number or may be operated automatically by a punched card or magnetic tape as is well known to those familiar with the art of digital control. As each of the switches 28, 29 and 30 is representative of a value indicative of an individual order of a binary number the respective flow rates of conduits 19, 20 and 21 are weighted to indicate corresponding orders of such binary number. Thus each of the conduits 19, 20 and 21 is provided with a manually adjustable valve or restricted orifice such as a conventional gate valve 34, 35 and 36 which collectively effect a predetermined relation between the flow rates in each of the conduits. For example, the restricting valves 34, 35 and 36 may be adjusted to provide respectively a flow rate of one unit in conduit 19, a flow rate of two units in conduit 20 and a flow rate of four units in conduit 21 when the associated valves 22, 23 and 24 are open.

It will be seen that the flow rates in the three parallel conduits each comprises a digital fluid signal respectively corresponding to the digital electrical signals supplied to the respective solenoid coils by the particular condition or state of the several command switches 28, 29 and 30. Further, the totality of switch conditions and the totality of flow rates each is proportional to the binary number indicated thereby. The digital fluid signals are hydraulically combined in conduit 18 to feed to motor 10 an hydraulic speed signal which is the hydraulic analog of the number which digitally indicates the desired motor speed. Thus, the network of valves and conduits 17 is in effect an hydraulic digital to analog converter.

It will be readily appreciated that the electrical binary control number supplied by means of the switches 28, 29, 30 and battery 32 may also be supplied by other two-state command devices as is well known in the art. Such devices may comprise electronic switches such as vacuum tubes and transistors connected to provide a bistable multivibrator with one such multivibrator being provided for each order of the control number.

The three conduits illustrated are weighted by restricting valves 34, 35 and 36 in accordance with powers of two to correspond to the first three binary orders. With this arrangement the analog output of the hydraulic digital to analog converting network is proportional to the input binary number. However, in those cases where there is no requirement that output speed be proportional to the control number, the conduits may be relatively weighted according to any other desired relation to provide eight different flow levels with but three valves.

While the arrangement of FIG. 1 illustrates a unidirectional hydraulic drive, it will be readily appreciated that suitable modification of the hydraulic motor and its connections may be effected to cause drive in the opposite direction for some values of the binary input number. Such a bidirectional drive arrangement is illustrated in FIG. 2. The arrangement of FIG. 2 is substantially identical in structure and function with the arrangement of FIG. 1 insofar as the control and hydraulic summing network is concerned and like parts in the two figures are indicated by like reference numerals. In the arrangement of FIG. 2 a fourth order of the binary control number as represented by an additional command device or switch 40 is arranged to effect reversal of the fluid flow through the cylinder whereby the direction of motion of the driven element is reversed. The common output conduit 18 of the hydraulic summing network 17 is coupled to a two-way solenoid valve 41 having a solenoid operated rotary element 41' which in the released position illustrated feeds fluid through conduit 42 to the input of a second two-way solenoid valve 43 having a solenoid operated rotary element 43' which in the released position thereof feeds fluid through conduit 44 to the cylinder 10. Fluid is discharged from the cylinder 10 through conduit 45 and through a two position solenoid valve 46 which is normally open but may be closed by actuation of the solenoid thereof. From the valve 46 the fluid is returned to sump 13 through conduit 47. The actuation coils 48, 49, and 50 of valves 41, 43 and 46 respectively are connected in series between ground and switch 40. Closing of switch 40 (and switch 31) energizes solenoid coils 48, 49 and 50 from the battery 32 to move each of valves 41 and 43 to a second flow conducting position thereof and to simultaneously close valve 46. With switch 40 closed and solenoid valves 41, 43 and 46 energized, fluid is conducted from conduit 18 through valve 41 to conduit 51 and thence to the motor 10. Fluid is discharged from the motor 10 through conduit 44, valve 43, and conduits 52 and 47 to the sump. Thus, the rate of flow of fluid through conduit 18 is still controlled in accordance with the several binary digits indicated by the condition of the switches 28, 29 and 30 as in the embodiment of FIG. 1. However, the direction of fluid flow through the cylinder 10 and thus the direction of motion of the driven element may be reversed by a fourth digit represented by the condition of the switch 40.

With the conduit flow rates weighted for proportional drive speed, a command binary number may be indicated, for example, by switch 28 closed, switch 29 open, switch 30 closed, and switch 40 open, and will yield a flow of 1+0+4=5 units of flow rate in a direction to move the piston of motor 10 to the right. A binary command number represented by switch 28 open, switch 29 closed, switch 30 open, and switch 40 closed will provide a flow rate of 0+2+0=2 flow rate units in a direction to move the piston to the left.

It will be readily appreciated that valves 34, 35, 36 and pump 14 in effect comprise three distinct digitally related flow rate sources and may actually be replaced by three separate pumps arranged to provide digitally related flow rates each individual to a single one of conduits 19, 20, and 21.

While the conversion network 17 has been disclosed for purposes of illustration to be located on the high pressure side of the pump, it is to be understood that the network 17 may be located on the exhaust side of the motor or load without departing from the principles of this invention.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a fluid control system, an input for receiving fluid under pressure, an output for providing output fluid flow, a plurality of conduits coupled in parallel between said input and output, means individual to at least two of said conduits for controlling fluid flow through the several ones thereof in proportion to successive digital orders, and means for selectively permitting flow through the several ones of said conduits.

2. A fluid control system comprising means for providing a plurality of fluid flow paths having a predetermined digital relation of fluid flow therein, means for permitting the fluid flow through a combination of said paths selected in accordance with a binary coded signal, and means for combining the fluid flow from said paths.

3. A fluid flow digital to analog converter comprising means for selectively permitting a plurality of fluid flows related in accordance with a digital code, means for receiving a plurality of electric signals corresponding individually to the digits of a digitally coded signal, means responsive to individual ones of said electric signals for controlling individual ones of said fluid flow, and means for combining said flows.

4. A digital to analog converter comprising means responsive to a digitally coded signal for providing a plurality of fluid flows corresponding respectively to the digits of said coded signal, and means for combining said fluid flows.

5. In a device of the class described, a plurality of conduits having digitally related individual fluid flows therein, and means for combining the fluid flows from digitally preselected ones of said conduits.

6. A binary hydraulic speed control comprising a hydraulic motor, a pressure source, a plurality of conduits connected in parallel between said pressure source and motor, flow restricting means effective to limit flow to digitally proportioned values in each of said conduits, means in each conduit for selectively blocking the flow of fluid therethrough, and means for actuating said blocking means.

7. An hydraulic speed controlled drive system comprising a pressure source, an hydraulic motor, conduit means operatively interconnecting said pressure source and motor, a plurality of digitally related control conduits each in fluid communication with said pressure source and said input conduit, a solenoid valve in each of said control conduits, and a plurality of switching means for selectively effecting individual actuation thereof.

8. The system of claim 7 wherein each of said switching means includes a command device operatively connected to one of said valves and individually representative of the value of one order of a binary number, each of said control conduits having valve means therein for adjusting fluid flow rate therethrough in accordance with the binary order of the command device individual thereto.

9. The system of claim 7 including valve means for reversing said motor, and switch means for actuating said reversing valve means.

10. In a device for producing movement precisely related to a control signal, a plurality of flow conduits adapted to transmit a pressure medium, said conduits being of cross-sections related digitally in area; on-off valve means in each of said conduits; and independently actuatable means for selectively positioning desired ones of said valve means, whereby a widely varying range of precisely controlled flows may be obtained with a minimum number of conduits.

References Cited in the file of this patent

UNITED STATES PATENTS

| | | |
|---|---|---|
| 1,047,329 | Sundh | Dec. 13, 1912 |
| 1,684,033 | Josephs | Sept. 11, 1928 |
| 2,160,920 | Strawn | June 6, 1939 |
| 2,246,461 | Cannon | June 17, 1941 |
| 2,385,351 | Davidsen | Sept. 25, 1945 |
| 2,437,109 | Maquat | Mar. 2, 1948 |
| 2,512,730 | Adams | June 27, 1950 |
| 2,516,495 | Waterson | July 25, 1950 |
| 2,714,371 | Porter | Aug. 2, 1955 |
| 2,889,109 | O'Brien | June 2, 1959 |

Notice of Adverse Decision in Interference

In Interference No. 93,324 involving Patent No. 2,999,482, J. L. Bower, Digital fluid control system, final judgment adverse to the patentee was rendered Apr. 2, 1964, as to claims 1, 2, 3 and 4.
[*Official Gazette August 25, 1964.*]